(12) United States Patent
Brooks et al.

(10) Patent No.: US 10,834,230 B2
(45) Date of Patent: Nov. 10, 2020

(54) SERVER REQUEST MANAGEMENT

(71) Applicant: INTERNATIONAL BUSINESS MACHINES CORPORATION, Armonk, NY (US)

(72) Inventors: Michael D. Brooks, Southampton (GB); Alan Hollingshead, Eastleigh (GB); Julian Horn, Eastleigh (GB); Philip I. Wakelin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/686,397

(22) Filed: Aug. 25, 2017

(65) Prior Publication Data

US 2019/0068751 A1 Feb. 28, 2019

(51) Int. Cl.
| | |
|---|---|
| *G06F 15/16* | (2006.01) |
| *H04L 29/08* | (2006.01) |
| *G06F 9/50* | (2006.01) |
| *G06F 9/46* | (2006.01) |
| *H04L 29/06* | (2006.01) |

(52) U.S. Cl.
CPC ........... *H04L 67/322* (2013.01); *G06F 9/466* (2013.01); *G06F 9/5027* (2013.01); *H04L 67/1002* (2013.01); *H04L 67/1008* (2013.01); *H04L 67/325* (2013.01); *H04L 67/42* (2013.01)

(58) Field of Classification Search
CPC .............. H04L 67/322; H04L 67/1002; H04L 67/1008; H04L 67/42; G06F 9/466
See application file for complete search history.

(56) References Cited

U.S. PATENT DOCUMENTS

| 5,913,028 A | 6/1999 | Wang |
| 6,633,914 B1 | 10/2003 | Bayeh et al. |
| 6,839,732 B1 * | 1/2005 | Vincent ................. H04L 29/06 707/999.01 |
| 7,171,479 B2 | 1/2007 | Buchanan |

(Continued)

FOREIGN PATENT DOCUMENTS

| CN | 103067359 A | 4/2013 |
| EP | 3037965 A1 | 6/2016 |
| WO | 2019038684 A1 | 2/2019 |

OTHER PUBLICATIONS

NPL IP.com (Year: 2020).*

(Continued)

*Primary Examiner* — Razu A Miah
(74) *Attorney, Agent, or Firm* — Steven M. Bouknight

(57) ABSTRACT

A transaction processing server and associated clients which send requests to the server via client-server connections. The server has a transaction processing region operable to process requests and issue responses to the requesting client. The server maintains a record of historical processing times taken to process recent client requests. The server has a connection manager that is operable to monitor incoming client requests and extract from them a goal response time, which is a maximum time within which the client expects the request to be processed which is included in each request. The server accepts or rejects each incoming client request based on deciding whether it is likely to be processed within the goal response time. If a request is rejected, the server transmits a rejection message to the originating client.

5 Claims, 8 Drawing Sheets

(56) References Cited

U.S. PATENT DOCUMENTS

| | | | |
|---|---|---|---|
| 7,315,892 B2* | 1/2008 | Freimuth | H04L 29/06 709/217 |
| 8,375,125 B1 | 2/2013 | Wu | |
| 8,893,249 B2 | 11/2014 | Arai | |
| 8,996,611 B2* | 3/2015 | Nightingale | G06F 9/5027 709/203 |
| 9,807,162 B2 | 10/2017 | Barman | |
| 2002/0143874 A1 | 10/2002 | Marquette | |
| 2002/0152307 A1* | 10/2002 | Doyle | G06F 9/505 709/225 |
| 2002/0161908 A1* | 10/2002 | Benitez | G06F 8/65 709/231 |
| 2003/0055969 A1* | 3/2003 | Begun | G06F 1/3203 709/226 |
| 2003/0131111 A1* | 7/2003 | Kimura | H04L 67/42 709/228 |
| 2003/0133407 A1* | 7/2003 | Segev | H04M 7/121 370/229 |
| 2003/0229695 A1* | 12/2003 | McBride | H04L 41/0896 709/224 |
| 2004/0177353 A1 | 9/2004 | Rao | |
| 2004/0264481 A1* | 12/2004 | Darling | H04L 29/06 370/401 |
| 2005/0114541 A1 | 5/2005 | Ghetie | |
| 2005/0138626 A1 | 6/2005 | Nagami | |
| 2005/0141506 A1* | 6/2005 | Aiken, Jr. | H04L 29/06 370/392 |
| 2005/0198285 A1* | 9/2005 | Petit | G06F 9/505 709/225 |
| 2006/0036764 A1 | 2/2006 | Yokota | |
| 2006/0259591 A1* | 11/2006 | Hashimoto | H04L 67/06 709/219 |
| 2007/0116039 A1* | 5/2007 | Gavagni | H04L 65/608 370/465 |
| 2007/0250565 A1 | 10/2007 | Minow | |
| 2007/0288587 A1* | 12/2007 | Aguilera | G06F 9/466 709/214 |
| 2009/0193091 A1* | 7/2009 | Hawkins | H04L 67/2823 709/206 |
| 2009/0271511 A1 | 10/2009 | Peracha | |
| 2009/0271515 A1 | 10/2009 | Iyengar | |
| 2010/0042743 A1* | 2/2010 | Jeon | H04L 29/12066 709/238 |
| 2010/0131659 A1 | 5/2010 | Narayana | |
| 2010/0271947 A1* | 10/2010 | Abdelal | H04L 47/263 370/235 |
| 2011/0093704 A1 | 4/2011 | Park | |
| 2011/0161488 A1* | 6/2011 | Anderson | H04L 47/10 709/224 |
| 2011/0294499 A1* | 12/2011 | Vikberg | H04W 24/02 455/423 |
| 2011/0296239 A1 | 12/2011 | Hsu | |
| 2011/0296240 A1 | 12/2011 | Hsu | |
| 2011/0302237 A1 | 12/2011 | Knight et al. | |
| 2012/0036254 A1* | 2/2012 | Onuma | H04L 67/16 709/224 |
| 2012/0066501 A1 | 3/2012 | Xiong | |
| 2012/0082057 A1* | 4/2012 | Welin | H04L 12/12 370/252 |
| 2012/0131163 A1 | 5/2012 | Ganapathi et al. | |
| 2012/0203822 A1 | 8/2012 | Floyd | |
| 2012/0226736 A1 | 9/2012 | Falchuk | |
| 2013/0080517 A1* | 3/2013 | T'Syen | H04L 45/00 709/203 |
| 2013/0080635 A1* | 3/2013 | Ho | H04L 67/32 709/225 |
| 2013/0173802 A1 | 7/2013 | Saffre | |
| 2013/0339529 A1* | 12/2013 | Rizzo | H04L 12/14 709/226 |
| 2014/0095592 A1* | 4/2014 | Hartrick | H04L 47/767 709/203 |
| 2014/0108492 A1 | 4/2014 | Garza | |
| 2014/0129658 A1 | 5/2014 | Barman | |
| 2014/0153422 A1 | 6/2014 | Nambiar et al. | |
| 2014/0297878 A1 | 10/2014 | Minami | |
| 2014/0304393 A1 | 10/2014 | Annamalaisami | |
| 2014/0310391 A1 | 10/2014 | Sorenson, III | |
| 2014/0310418 A1 | 10/2014 | Sorenson, III | |
| 2014/0317178 A1* | 10/2014 | Purpura | H04L 63/10 709/203 |
| 2014/0379655 A1* | 12/2014 | Kothule | G06F 16/27 707/634 |
| 2014/0379871 A1* | 12/2014 | Van Brandenburg | H04L 67/025 709/219 |
| 2015/0019637 A1* | 1/2015 | Backholm | H04L 61/1511 709/203 |
| 2015/0019687 A1* | 1/2015 | Aaron | H04L 67/42 709/219 |
| 2015/0088975 A1 | 3/2015 | Wei | |
| 2015/0235015 A1* | 8/2015 | Holler | G06F 21/121 726/27 |
| 2015/0341428 A1* | 11/2015 | Chauhan | H04L 69/16 709/203 |
| 2016/0241565 A1 | 8/2016 | Greene | |
| 2016/0337426 A1 | 11/2016 | Shribman | |
| 2016/0380849 A1* | 12/2016 | Kawamori | G06Q 10/10 709/224 |
| 2019/0068752 A1 | 2/2019 | Brooks | |

OTHER PUBLICATIONS

NPL google patents (Year: 2020).*

IBM: List of IBM Patents or Patent Applications Treated as Related (Appendix P), Jan. 17, 2018, 2 pages.

Pending U.S. Appl. No. 15/813,262, filed Nov. 15, 2017, entitled: "Server Request Management", 38 pages.

Mell et al., "The NIST Definition of Cloud Computing", Recommendations of the National Institute of Standards and Technology, Special Publication 800-145, Sep. 2011, 7 pages.

IBM, "Determining system response time goals", http://www.ibm.com/support/knowledgecenter/SSLTBW_22.0/com.ibm.zos.v2r2.ieaw100/give.htm, Accessed on Aug. 9, 2017, 2 pages.

IBM, "Interface ECIReturnCodes", CICS® Transaction Gateway z/OS Base API Programming Reference v8.1.0.0, https://www.ibm.com/support/knowledgecenter/SSZHJ2_8.1.0/basejavadoc/com/ibm/ctg/client/ECIReturnCodes.html, Accessed on Aug. 9, 2017, 10 pages.

IBM, "Using EXEC CICS LINK command", http://www.ibm.com/support/knowledgecenter/SSGMCP_5.3.0/com.ibm.cics.ts.doc/dfhtm/topics/dfhtm4w.html, Accessed on Aug. 9, 2017, 6 pages.

International Search Report and Written Opinion for Application No. PCT/IB2018/056345, dated Dec. 26, 2018, 9 pages.

* cited by examiner

SERVER REQUEST MANAGEMENT

FIELD OF THE INVENTION

The present disclosure relates to methods and apparatus for managing client connections to a server to manage high loading.

BACKGROUND

A transaction processing region of a server, such as a Customer Information Control System (CICS®) Transaction Server (TS) for IBM® z/OS®, may receive work from its clients over multiple network connections. These connections can either be short lived or long lived. Connections from a web browser, for example, are generally long lived and may support potentially significant numbers of multiple concurrent requests. The requests from long-lived connections will therefore require management in order to ensure efficient operation, which is the subject of the present disclosure. Request and response messages are serialised over the connection and will typically be in packet form with a header portion and a payload portion. A message will contain request data that the client is passing to the server (or vice versa), which will form the payload or body of the message. The message will also contain metadata, which will form one or more headers of the message, where the role of the metadata is to provide instructions to the recipient of the message on how to handle the request data. Connections may be established when the server component starts up, and may be added or removed as the server component remains active. The server component will have a finite capacity, limited by factors such as the amount of use it can make of the central processing unit (CPU) of the machine it runs on, and the amount of memory it has access to. The system administrator configures server components to maximise the amount of work they can support, without running the risk of stalling because of resource shortages, and takes measures to avoid server components failing altogether from becoming highly loaded. In this context, a stall is a condition that occurs in the server when resource contention impacts the processing of application tasks. A limit is set on the maximum number of tasks that the server component can run concurrently. Typically, this is greater than the number supported over an individual connection into the server component, but less than that for all the connections together, as there will be times when one connection is very busy while others are lightly loaded.

It may sometimes occur that a server component becomes highly loaded, i.e. reaches its full capacity, when too much work arrives over a set of connections. The excess work requests received when the server component is already at full capacity cannot be processed immediately, so are queued in the server component, waiting for a time when they can be processed. However, the queue itself and its management consumes further system resources in the already-overloaded server component. There is currently no mechanism to automatically resolve these network issues, when a server component detects it cannot cope with its current workload.

Controls are known which prevent one network node from flooding a partnered network node with requests, when the partner is unable to process its current workload. For example, it is known to configure the request sender (referred to in this document as the client) so that it only has a fixed number of request slots. For example, a parameter configuring a "Number of Send Sessions" can be used to set a maximum number of concurrent requests that a client can route over a connection. The number is set when the connection is first established and persists for the lifetime of the connection. Another known example is where the service provider (referred to in this document as the server) maintains a queue for requests that have been received, but not yet processed, and, when the queue is full, the server causes any additional requests that it receives to be rejected. These approaches work well for paired systems which have only a single connection between them, as their overall capacity can be calculated in advance and so the capacity of the connection can be set to match. However, large scale systems often have multiple points of entry and so it is not a simple to task to configure their connections in a way which provides for efficient management of these requests.

For example, an IBM CICS® TS for a z/OS production server component is likely to have multiple connections to it over which request messages may arrive. The request traffic rate over any single connection is likely to vary considerably over time. Moreover, the request traffic rate between different connections is also likely to vary considerably over time. It is not practical to configure a server to match the maximum capacity of all of its clients, as this would lead to large amounts of redundancy, as well as wasted resources that are unused unless demand is near peak. Instead, each connection is configured to support more than its fair-share of the server's overall capacity so that during times when the server is less busy a busy client can route a higher rate of requests to the server. Consequently, there may be prolonged periods of time during which requests are queued before they can be serviced by the server, or during which requests are rejected by the server.

To address this issue, it is known for clients to use additional software to discover if they are using a particular connection to its full capacity: IBM z/OS Work Load Manager (WLM) and IBM Tivoli® Netview® are examples of such workload balancing software. Workload load balancing is a technique to distribute TCP/IP-based workload requests (connections) across similar server applications to achieve optimal resource utilization, maximize throughput, minimize response time, and to avoid overloading server applications or systems. By using multiple server applications (instead of a single server application) with load balancing, one can increase reliability through redundancy. The load balancing service usually is provided by a dedicated software program or hardware device. A workload manager provides distribution recommendations to the load balancing service (i.e. a load balancer appliance).

In workload management environments of this type, server applications that access the same data sources typically are included in the same workload. This allows monitoring agents to verify that all of these applications are available and able to handle additional connections on behalf of the workload. It also enables a workload manager to have a consolidated view of the applications in the workload, thereby enabling easy switching of the workloads between geographically separated sites (i.e., different clusters of systems). In particular, the workload manager can signal a load balancer appliance that all connections to the server applications making up the workload are to be switched at the same time to the alternate site. This ensures that access by the applications to the data sources is only done from one site at any point in time. The workload balancing software runs alongside the systems that are using the connection. There is however the disadvantage that such additional software has to be configured separately from the connection it monitors.

Another known approach to deal with high server loading is for the server to send clients data relating to the server's load state, which we refer to as health data. Using the server's load state data, the client can decide whether to send or to delay sending requests to the server, if the server is already busy.

BRIEF SUMMARY OF THE INVENTION

In the present disclosure, we propose a coping mechanism for automatically managing persistent high loads in the transaction processing region of a server arising from the server receiving high numbers of requests in a given time period, whether that be on one connection or multiple concurrent connections, wherein the coping mechanism operates independently of any workload balancing measures which may or may not also be provided in parallel.

According to one aspect of the disclosure, there is provided a transaction processing server capable of managing client connections, the server comprising:

a client-server connector operable to establish, maintain and terminate individual client-server connections to the server, each connection being capable of transmitting client requests to the server;

a transaction processing region of the server operable to process client requests and issue responses;

a server performance manager operable to maintain a performance record of how quickly client requests are being processed; and a connection manager operable to monitor incoming client requests and extract from them a goal response time indicative of to the transaction processing server to process the client request within the goal response time, and to accept or reject each incoming client request based on the goal response time and with reference to the performance record.

The proposed approach allows the server to treat each request differently based on a client-specified urgency requirement. The server also avoids getting stalled through consuming resource managing requests it is too busy to handle. The approach also does not involve using a third party resource to manage the situation, but rather is based solely on the server acting on the client-specified goal response time. The approach can also make recovery of transaction work on the server less complex, since the client is not likely to need to send a 'cancel request' to the server in respect of a request that has not been responded to within a goal response time, because the request will have been rejected by the server up front. Conventionally, such 'cancel requests' create work for the server, especially if the server has started processing the request and is then required to back out of work done through a purge process.

The connection manager is optionally further operable to transmit request rejection messages to clients that have originated rejected requests. The client is thus informed directly that the request will not be processed, so that for example the client is free to resend the request to an alternative server that may be at a lower utilisation and has a better chance of running the request more quickly. The request rejection messages may include predicted response times for processing the request, which has been obtained with reference to the performance record. This additional information can then be used by the client when it receives the rejection to decide how best to react. For example, the client would have the option of resending the same request to the same server, but this time specifying a goal response time set with reference to the predicted processing time contained in the rejection, e.g. equal to it, or equal to some larger value, e.g. 20% greater, 50% greater or double.

The connection manger is advantageously operable to transmit request rejection messages within a much shorter time than processing the request should take. For example, the connection manger in some embodiments is operable to transmit request rejection messages within a fraction of the goal response time (e.g. $\frac{1}{5}$, $\frac{1}{10}$, $\frac{1}{20}$, $\frac{1}{50}$ and $\frac{1}{100}$). Another example would be to transmit request rejection messages within a fraction of an expected response time deduced from the performance record. Generally, the aim of the design should be to ensure that any rejection should take place over a much shorter timescale than the time taken to process requests, so that the client has an immediate, or near immediate, response that the request was rejected. This enables the client to react, e.g. by sending the request to a different server.

Assuming the communication on the connection is packet based, which will be the case for many embodiments, the request rejection messages are conveniently inserted in metadata of server-to-client data packets, for example as "server busy" responses. The metadata could be inserted into a specific packet generated for the purpose of conveying the rejection, or could be added to a packet or group of packets carrying other information, e.g. packets returning the results of another processed request. The goal response time is also conveniently contained in metadata of the client request.

The request rejection/acceptance testing can be carried out either globally for all requests, or specific to a transaction type, in which case the requests have a transaction type, and the performance record includes historical processing times for client requests. In some embodiments there will be a historical processing time for each of a plurality of transaction types. For example, if there are five different types of transaction, then five different recent response time values can be maintained in the performance record.

The historical processing time may be an average time aggregated from relevant recent client requests. The average may be weighted by recency with more recently processed client requests having a higher weighting. Alternatively, the average could be a simple average without weighting, i.e. where each element has equal weighting. Moreover, it will be understood that the average could be a mean, mode or median value.

In certain embodiments, incoming client requests are accepted or rejected based on a comparison of the goal response time and a historical response time relevant to the client request being assessed. The performance record may be based on client requests processed within a window defined by at least one of: time, e.g. in the last 200 seconds or since 12:28 CET (Central European Time). Alternatively, the window could be defined by a number of client requests, e.g. be based on the last 100 processed requests or the last 5 requests of a particular type that have been processed.

The server may further comprise a queue in which client requests for the server are queued when the server currently has no capacity to accept them. In some embodiments, the connection manager acts as a gatekeeper for the queue, so that requests are only placed in the queue after they have been screened and accepted. That is, the connection manager is operable to gate access to the queue such that incoming client requests are added to the queue conditional on being accepted, so that rejected requests are denied access to the queue. In this way, it is avoided that requests that are rejected consume queue resource. In other embodiments, the connection manager performs its screening on the queue, so all requests enter the queue, but are only cleared to leave the queue after being checked by the connection manager and accepted for transaction processing. Namely, the monitoring of incoming client requests by the connection manager takes place by watching the queue, with rejected client requests being deleted from the queue. This approach still allows for rapid rejections to be sent to clients, while avoiding the possibility of overloading the connection manager, or having to provide the connection manager with its own separate queue.

According to another aspect of the disclosure, there is provided a method of managing client connections to a transaction processing server, the method being performed by the server and comprising:

receiving a client request from a client on a client-server connection;

extracting from the client request a goal response time indicative of how quickly the client wishes to have the request processed; and accepting or rejecting the client request based on the goal response time and with reference to a performance record of how quickly client requests are being processed that is maintained by the server.

The method may further comprise transmitting a rejection message to the client if the request was rejected. In some embodiments, the client request includes a type classification, and the indicator used for accepting or rejecting the request is specific to that type.

According to another aspect of the disclosure, there is provided a computer program product, comprising:

a computer readable storage medium having program instructions embodied therewith, wherein the computer readable storage medium is not a transitory signal per se, the program instructions executable by a processor to cause the processor to perform a method comprising:

receiving a client request from a client on a client-server connection;

extracting a goal response time from the client request, wherein the goal response time indicates to the transaction processing server to process the client request within the goal response time;

accepting or rejecting the client request based on a comparison of the requested goal response time to a performance record of completion times for a requested type of transactions on the transaction processing server; and based on the comparison indicating to reject the client request, the transaction processing server including in a rejection message an estimated amount of time to complete the client request.

BRIEF DESCRIPTION OF THE DRAWINGS

In the following, the present invention will further be described by way of example only with reference to exemplary embodiments illustrated in the figures.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

A client according to embodiments of the present disclosure may be any suitable computing device; for example, a mobile phone (smartphone), phablet, tablet, laptop computer, gaming console, personal computer, smart television or media player. The computing device may be a user equipment as defined by one or more telecommunications standards. The computing device may be portable, e.g. a handheld computing device, or fixed.

Figure 1:
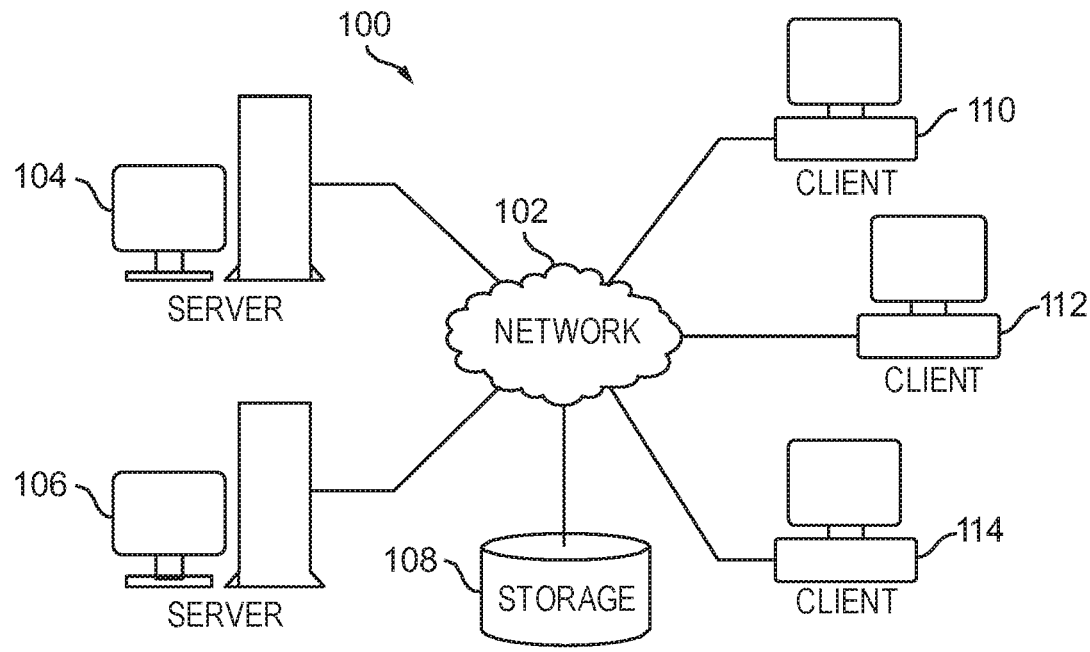
FIG. 1 is an exemplary block diagram of a distributed data processing environment in which exemplary aspects of the illustrative embodiments may be implemented.

FIG. 1 is an exemplary block diagram of a distributed data processing system 100 with which exemplary aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables. Network 102 may be an external network such as the Internet, or an internal network such as an Ethernet Network or a Virtual Private Network (VPN).

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

Server 104, 106 each include or have access to a computing device comprising one or more processors and one or more memories, and potentially any other computing device elements generally known in the art including buses, storage devices, communication interfaces, and the like. The server having an input port for receiving communication from other computing devices including those with which it may form a client-server communication channel, and an output port for transmitting communications to other computing devices including those with which it may form a client-server communication channel.

Distributed data processing system 100 may in one example be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

As shown, the various information processing systems, including servers 104, 106, clients 110, 112, 114 and other network resources such as storage 108 or an optional network workload manager (not illustrated), can be networked together using computer network 102. Types of computer network 102 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. The nonvolatile data store can be a component that is external to the various information processing systems or can be internal to one of the information processing systems.

Figure 2:
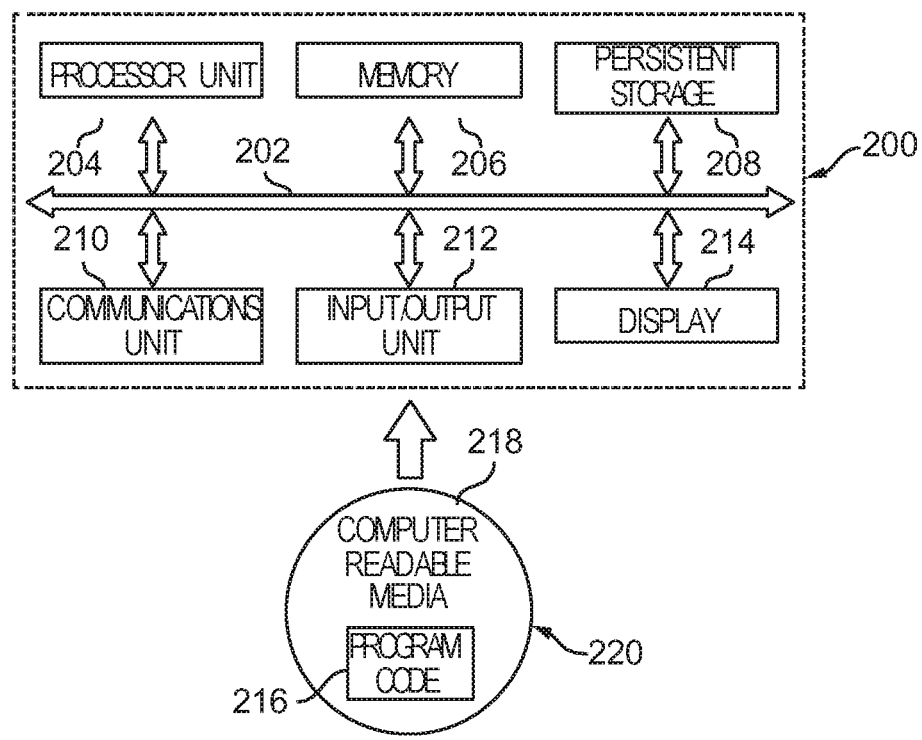
FIG. 2 is an exemplary block diagram of a data processing system in which exemplary aspects of the illustrative embodiments may be implemented.

FIG. 2 is a block diagram of a data processing system in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, Bernoulli cartridges, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the SMP system mentioned previously.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF) Familiarity with these standards is presumed.

In various embodiments, the network 102 may be a public network, such as the Internet, a physical private network, a virtual private network (VPN), or any combination thereof. In certain embodiments, the network 102 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as Wi-Fi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on third, fourth or fifth generation (3G, 4G, 5G) wireless technologies including universal mobile telecommunications system (UMTS) and wideband code division multiple access (W-CDMA) and new radio (NR).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and 4G or 5G wireless technologies.

A server in the context of embodiments of the disclosure may in some cases also be a 'classic' mainframe, or hosted in a mainframe. Mainframe computer systems are widely used for a variety of data processing functions. For example, many corporate financial and accounting systems were developed for, and operate on, mainframe computing systems. Although the use of personal computers and personal computer networks has proliferated in recent years, mainframe computer systems, referred to as legacy systems, are expected to remain popular for many types of data processing for years to come. A mainframe computer system typically includes multiple user terminals connected to a mainframe host computer. Various software applications may be resident on, or accessible to, the host computer. The user terminals, which are sometimes referred to as client terminals or "clients," communicate with the mainframe host computer via a host communications system. The IBM 3270 terminal system is one of the more widely-used systems for communicating with host computers. Typically, a 3270 terminal does not have its own data processing capability. Instead, a 3270 terminal may display screens generated by applications running on a host, and may communicate information from a user back to a host for processing. A user interface of an IBM 3270 terminal system comprises a plurality of screens that are generated by host applications for display on the 3270 terminal. Over the past few years, many 3270 terminals have been replaced with personal computers (PCs) configured to communicate with the mainframe computer system via 3270 terminal emulation software.

In many applications, 3270 terminals, or other data processing devices (e.g., a PC), now access the host computer via the Internet. For example, in systems operating under the TN3270E protocols, the 3270 terminals may access application software on a host computer via a combination of a TCP/IP connection between the TN3270E client terminal and a TN3270E server, and via a Systems Network Architecture (SNA) session between the TN3270E server and the SNA application software on the host mainframe computer.

It is also known to integrate client-server technologies within mainframe computing environments. A representative multi-component system of this type, wherein components work together cooperatively to form a larger system, is the IBM® HyperText Transfer Protocol (HTTP) and Web Services processing environment, which may be implemented using IBM mainframe computers, such as the IBM z196 family of computing machines. This environment typically includes IBM WebSphere® Application Server (WAS) middleware platform software product, working in conjunction with one or more transaction processing products, such as IBM CICS (Customer Information Control System) and/or IBM Information Management System (IMS), a message processing product, such as IBM WebSphere® MQ, and a relational database, such as IBM DB2®. An objective of a multi-component environment is to provide a high performance transaction processing computing system or environment accessible to client end-users via Internet browsers using HTTP or other Web Services. In this environment, the client end-user making the HTTP or Web Services request communicates directly with the application server. Typically, to fulfill the transaction request from the distributed client end-user, the application server invokes the services of one or more other components in the environment. One or more of these components typically execute on an operating system, such as IBM z/OS operating system, which is often referred to as a "mainframe" operating system platform.

Figure 3:
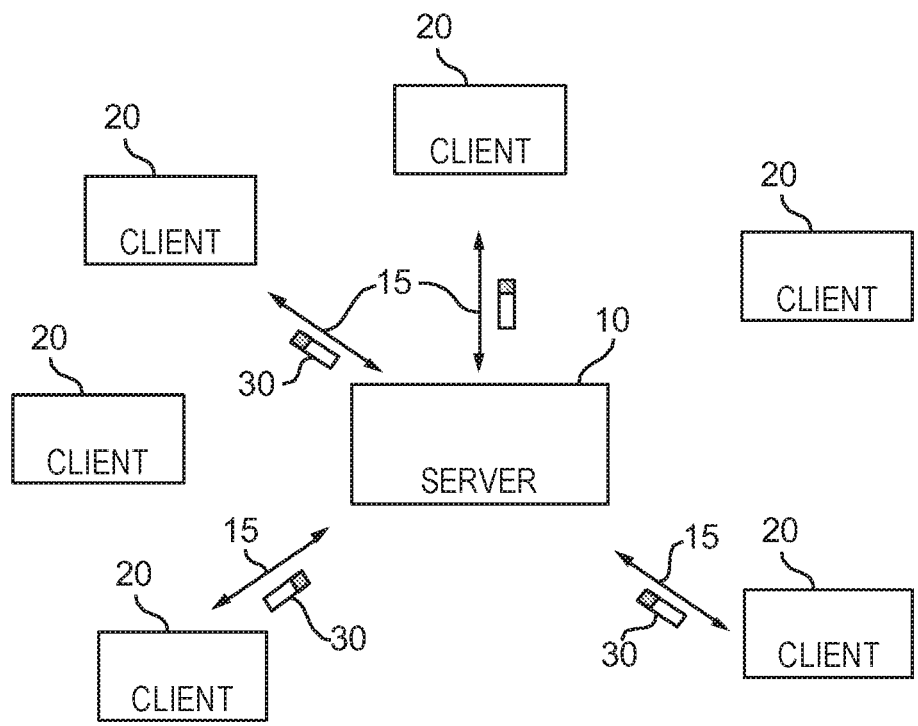
FIG. 3 is a schematic representation of a system environment for embodiments of the invention in which a single server and multiple clients are connected via network connections.

FIG. 3 is a schematic representation of a system environment for embodiments of the invention in which a single server and multiple clients are connected via network connections. A server 10, which may for example be a CICS Transaction Server (TS) and may correspond to either of the servers shown in FIG. 1, is in a system region where a number of clients 20 are also arranged. The system uses a network protocol, such as TCP/IP, to allow the different nodes to communicate. Each client 20 is able to establish a network connection 15 using the network protocol to at least the server 10. The network connections persist until terminated, so may be long lived. Selected ones of the clients are shown having current network connections to the server, noting that multiple concurrent network connections are illustrated. Each established network connection is managed by sending and receiving messages 30, typically in packet form, from server to client and client to server respectively. Client-to-server messages may contain tasks or requests for the server, and server-to-client messages may contain responses relating to such tasks or requests.

Figure 4:
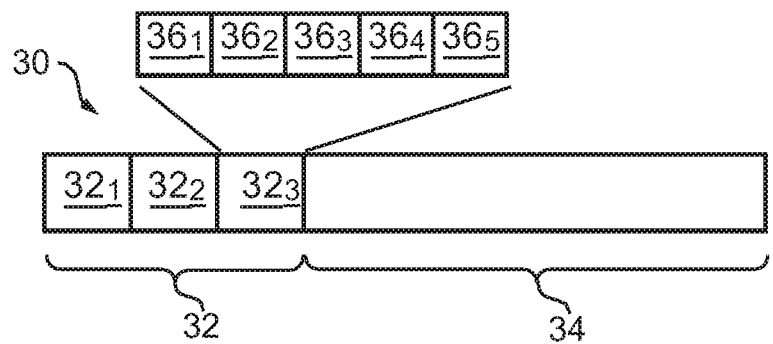
FIG. 4 shows a message structure for messages being sent via the network connections of FIG. 3.

FIG. 4 shows a message structure for messages being sent via the network connections of FIG. 3. Each message comprises a header portion 32 and a payload or body portion 34. The header contains control information that is used by the message recipient's connection manager, whereas the body 34 contains details of the service that the client is requesting to run there. The header portion 32 may be split into a set of multiple fields $32_1, 32_2 \ldots 32_n$ each conveying different command and control information relating to the message by which its payload portion 34 can be appropriately processed on receipt. It is noted that the header fields may simply be referred to as headers, so that each message can be described as being made up of a set of one or more headers and a body.

Figure 5A:
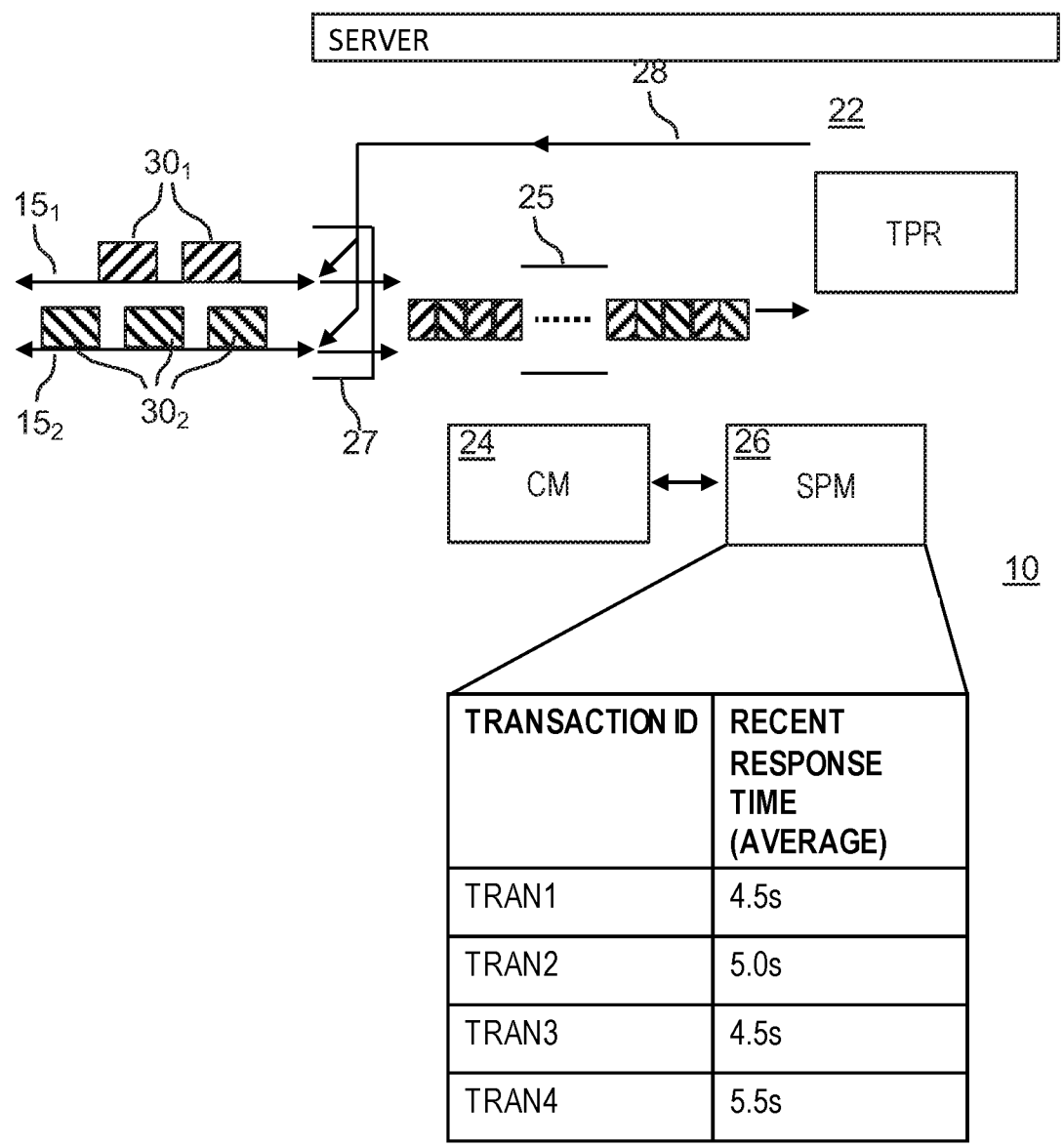
FIG. 5A shows the server of FIG. 3 in more detail.

FIG. 5A shows the server 10 of FIG. 3 in more detail. By way of example to discuss the operating principles, two current client connections are shown $15_1$ and $15_2$, although it will be appreciated there may be any number from one upwards and in practice the number will usually be more than two. A client-server connector 27 acts as an input/output interface of the server 10 and, in particular, is operable to establish, maintain and terminate individual client-server connections $15_1$ and $15_2$ to the server 10. Packets $30_1$ and $30_2$ are sent from the respective clients on connections $15_1$ and $15_2$ respectively, the packets containing messages for the server 10 including requests or tasks. Each of the connections may be specified with a maximum concurrent request limit. For example, the maximum concurrent request limit could be 100 for connection $15_1$ and 50 for connection $15_2$, with the server's maximum concurrent request limit being 120. This is a typical configuration in the sense that the combined concurrent connection session limit of 150 exceeds the server's limit of 120.

The incoming requests are queued in a queue 25 which feeds in to a transaction processing region (TPR) 22 of the server 10, which processes the requests or tasks. When the TPR 22 is operating at less than full capacity, the requests will be directly input into the TPR 22 with no appreciable waiting time in the queue 25 or may bypass the queue completely. On the other hand, when the TPR 22 is operating at full capacity, the requests will be queued. Processed requests are replied to by the TPR 22 issuing reply information which is assembled into packets and sent back to the client that originated the request on client connection $15_1$, $15_2$ etc. as indicated by the arrowed lines flowing from TPR to client connections $15_1$ and $15_2$.

The server 10 is additionally provided with a connection manager (CM) 24 and a server performance monitor (SPM) 26.

The role of the SPM 26 is to maintain a performance record of how quickly client requests are being processed. This is done by storing an average response time for each transaction type, as for example specified by a transaction identifier 'Transaction ID', as indicated in FIG. 5A where the SPM 26 is shown containing a lookup table in which four transaction IDs, TRAN1 . . . 4 are shown, each with an average recent response time value of 4.5, 5.0, 4.5 and 5.5 seconds respectively. The recent response times are thus a historical record of recent processing times. The average may be weighted by recency with more recently processed client requests having a higher weighting. Alternatively, the average could be a simple average without weighting, i.e. where each element has equal weighting. Moreover, it will be understood that the average could be a mean, mode or median value. The performance record may be based on client requests processed within a window defined by at least one of: time, e.g. in the last 200 seconds or since 12:28 CET. Alternatively, the window could be defined by a number of client requests, e.g. be based on the last 100 processed requests or the last 5 requests of a particular type that have been processed. The window values for time, number of requests, and number of requests within a particular type can be configured, for example, by a systems administrator.

The role of the CM 24 is to monitor incoming client requests. This is done by extracting a goal response time stored in the request that is indicative of how quickly the client wishes to have the request processed. The CM 24 then accepts or rejects each incoming client request based on comparing the goal response time with an expected response time that is either stored in the performance record or is deduced from information stored in the performance record. On rejection of a request, the connection manager generates, or causes to be generated, a request rejection message for the requesting client, which is then transmitted to that client over the connection.

For packet-based communication on the client-server connection, which will be the case for many embodiments, the request rejection messages are conveniently inserted in metadata of server-to-client data packets by the client-server connector 27, for example as "server busy" responses. The metadata could be inserted into a specific packet generated for the purpose of conveying the rejection, or could be added to a packet or group of packets carrying other information, e.g. packets returning the results of another processed request.

In case that the incoming client request does not contain a goal response time, i.e. the client is not configured to operate according to the proposed approach, the CM 24 may be configured either with a default to accept the request, or a default to reject the request. The default may be applied regardless, or the default may be changed adaptively between 'accept' and 'reject' based on current server loading or number of pending concurrent requests.

The CM 24 also has the independent role of monitoring the number of requests received from each connection attached to clients and from which client the requests originated. For example, at one time, CM 24 may know that there are 38 as-yet un-replied requests from a first connection and 17 as-yet un-replied requests from a second connection. CM 24 monitors connections being established and terminated, and so maintains a record of the connections that are currently active, and for each active connection the maximum number of concurrent requests it is capable of, or permitted to, support. CM 24 may also keep a record of the maximum number of outstanding requests from each connection during a current session, or in the recent past based on a rolling time window. This maximum number will therefore represent a high water mark of activity for a given connection.

SPM 26 monitors the spare capacity of the server 10 and in particular the TPR 22 to handle client requests. SPM 26 has knowledge of the maximum capacity of the server 10, and monitors how many requests it is currently handling, and thereby monitors the loading level of the server. In particular, SPM 26 detects when the server 10 is approaching, or has reached, full capacity. SPM 26 can directly monitor how many requests the server is handling, or can infer that full capacity has been reached by monitoring the fill state of the queue 25. That is, if the queue 25 is empty or near empty, then it can be inferred the server has spare capacity, whereas if several requests are queued or queue dwell time per request is above a threshold time, then it can be inferred that the server is operating at or near full capacity. SPM 26 also is operable to analyze metadata in each request, either in the incoming packets 30, or in the requests waiting in the queue 25, which serves as an identifier of the originating client 20 or client-server connection 15.

This is an example of a client-request management activity to avoid overloading that is operating fully independently of the proposed method of pre-screening requests based on comparing the desired, goal response time, with a predicted response time. It will therefore be appreciated that the proposed method based on comparing goal response times with recent average response times can be the only high load coping mechanism or can be one of several coping mechanisms that are separately and independently operating in parallel.

Figure 5B:
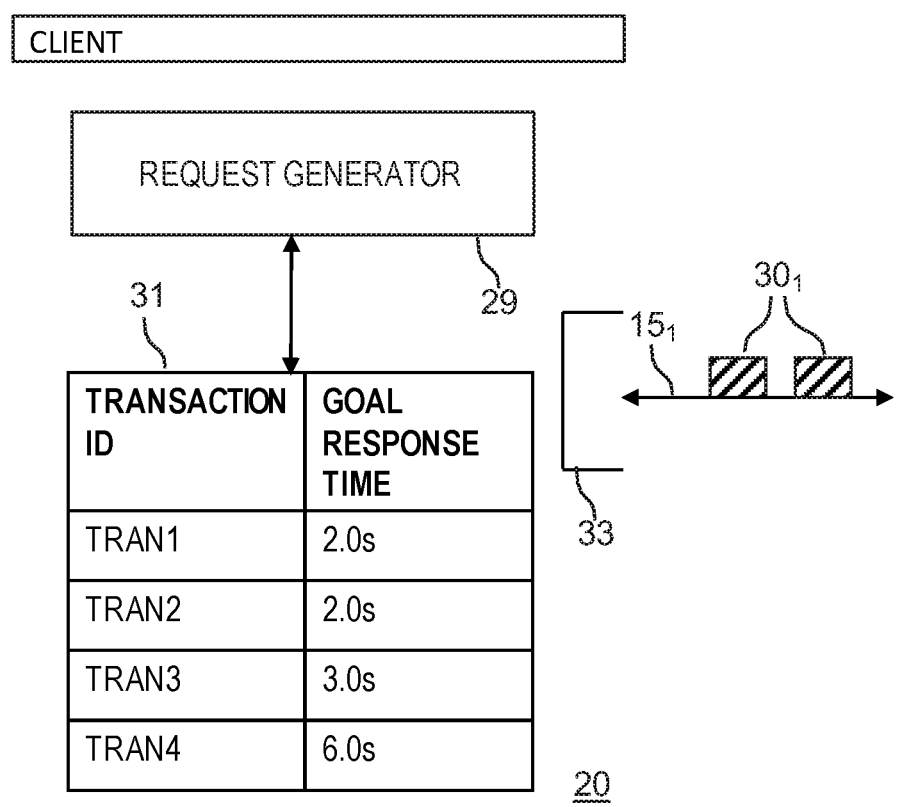
FIG. 5B shows a client of FIG. 3 in more detail.

FIG. 5B shows an example of one of the clients 20 of FIG. 3 in more detail. The client 20 has a client-server connector 33 which is operable to establish, maintain and terminate client-server connections to one or more servers, each connection being capable of transmitting client requests to a particular server, for example using packets 30₁ as illustrated. The client 20 also has a client request generator 29 which is operable to include goal response times in client requests, which inform the server how quickly responses are desired. This is done by storing a goal response time for each transaction type, as for example specified by a Transaction ID, as indicated in FIG. 5B with a lookup table 31 which stores goal response times for each of four transaction IDs, TRAN1 ... 4, having time values of 2.0, 2.0, 3.0 and 6.0 seconds respectively. The goal response times are thus specific to each particular client, i.e. local to that client. It is noted that although the information is shown represented in a lookup table, and this is one possible real-world implementation, in other embodiments the same information could be embedded in application logic. Generally, the response time goal information could be incorporated in any suitable implementation form.

The client 20 can supply the response time goal as meta-data with every request that it sends to the transaction processing server 10. The server 10 can then return a 'server busy', or more specific, error, if the server's analysis based on the current system state is that the response time goal is unlikely to be met. Since the transaction processing server 10 maintains a recent history of transaction response times classified by Transaction ID, if the server becomes highly loaded, the response times will become degraded and this will be reflected in the performance record of recent transactions. The response time goal is appended as meta-data which accompanies the request to run a transaction in the transaction processing region 22.

When the client request arrives in the CM 24 component of the transaction processing server 10, the response time goal and transaction ID is extracted from the meta-data and the history data for the transaction ID of the request is accessed. If the goal is deemed to be achievable, the request is accepted. On the other hand, if it is deemed not to be achievable, the request is immediately rejected with a response such as a SERVERBUSY response. Optionally, the predicted response time for the transaction ID could be returned as meta-data with the SERVERBUSY response, so that the client is able to consider this additional information when deciding how best to react to the rejection.

In the illustrated example values shown in the lookup tables of FIGS. 5A and 5B, the transaction processing region 22 is highly loaded, its recent response time averages being all in multiples of seconds. Based on the response time goals specified by the client, the only transaction ID which the server would accept at this time is TRAN4.

After the 'server busy' code or other rejection message is received, the client may react in any one of several ways. For example, it could perform one of the following actions, optionally using the predicted response time from the server if that was sent back to the client as part of the rejection message from the server:
 a. resubmit the request to another server system;
 b. resubmit the request to the same server with a longer goal response time, e.g. one matched or exceeding the server's predicted response time;
 c. fail the request and return an error the calling interface.

Figure 6A:
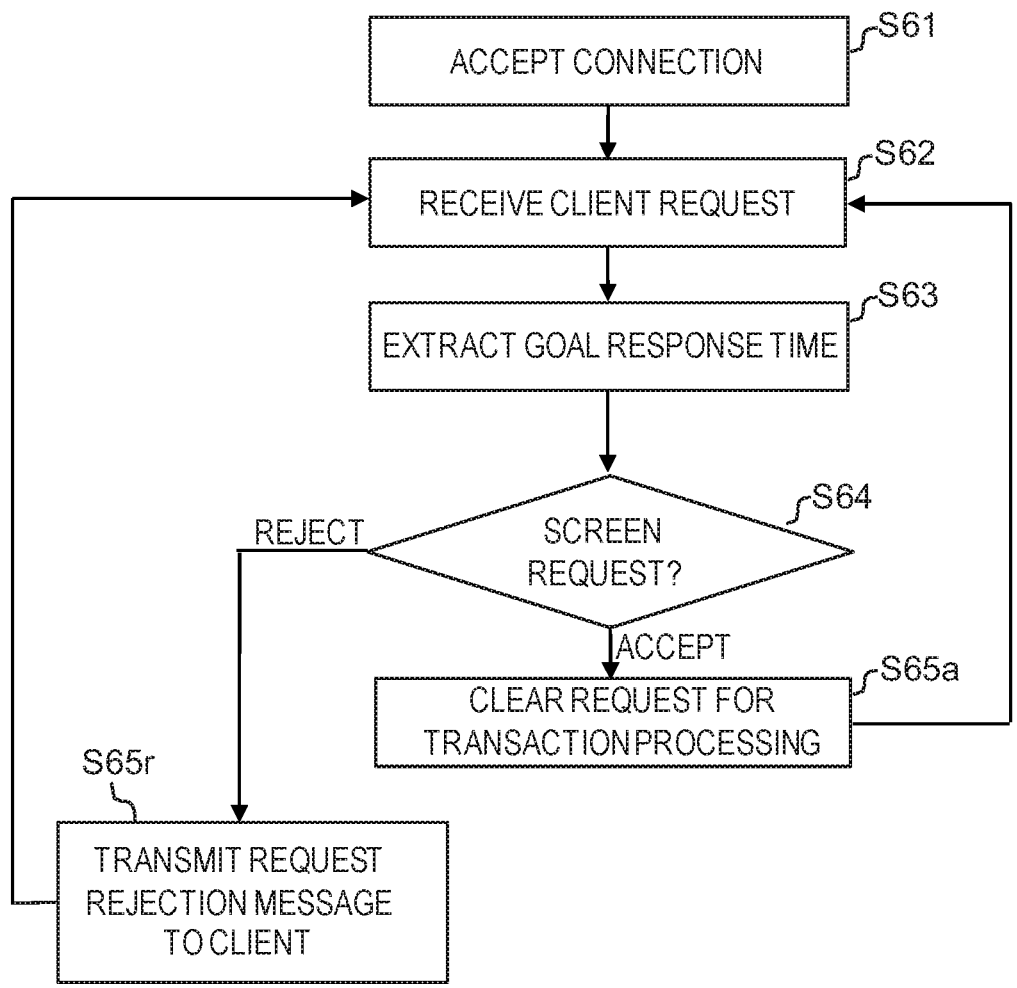
FIG. 6A is a flow chart of the connection management performed by the server of FIG. 5A.

FIG. 6A is a flow chart of the connection management performed by the server of FIG. 5A.

In Step S61, a client-server connection is established in collaboration with a client, in that the server accepts a connection request from a client.

In Step S62, the server receives a request from a client on the client-server connection.

In Step S63, the server extracts from the client request a goal response time indicative of how quickly the client wishes to have the request processed.

In Step S64, the server screens, i.e. analyzes, the request to decide whether it should be accepted or rejected based on the goal response time specified by the client in the client request. This is done with reference to the performance record stored by the server, which records how quickly client requests are currently being processed, i.e. over the recent past. As described above, it is envisaged that this is done based on transaction type, i.e. transaction ID, so that the relevant factor is how quickly client requests of the same type as the request are currently being processed.

In Step S65r, which is executed following a rejection decision, the server composes and transmits a rejection message to the client. Optionally, the rejection message may include a time indication of how long the request would likely have taken to process had it been accepted. For example, if the goal response time was 3.5 seconds, then the predicted response time will have been longer than that to have resulted in a rejection, e.g. 5.0 seconds, and it is this latter value that is contained in the rejection message. Subsequently further client requests may be processed in the same way as indicated by the return flow arrow from Step S65r to Step S62.

In Step S65a, which is executed following an acceptance decision, the server clears the request for processing in the transaction procession region of the server. Subsequently further client requests may be processed in the same way as indicated by the return flow arrow from Step S65a to Step S62.

How incoming requests are screened, and then accepted or rejected, will involve making some configuration decisions in relation to the server queue where client requests are queued prior to being acted upon by the transaction processor.

One design option is for the connection manager to act as a gatekeeper for the queue, so that requests are only placed in the queue after they have been screened and accepted. That is, the connection manager is operable to gate access to the queue such that incoming client requests are added to the queue conditional on being accepted, so that rejected requests are denied access to the queue. In this way, it is avoided that requests that are rejected consume queue resource.

Another design option is that the connection manager performs its screening on the queue, so all requests enter the queue, but are only cleared to leave the queue after being checked by the connection manager and accepted for transaction processing. Namely, the monitoring of incoming client requests by the connection manager takes place by watching the queue, with rejected client requests being deleted from the queue. This approach still allows for rapid rejections to be sent to clients, while avoiding the possibility of overloading the connection manager, or having to provide the connection manager with its own separate queue.

Figure 6B:
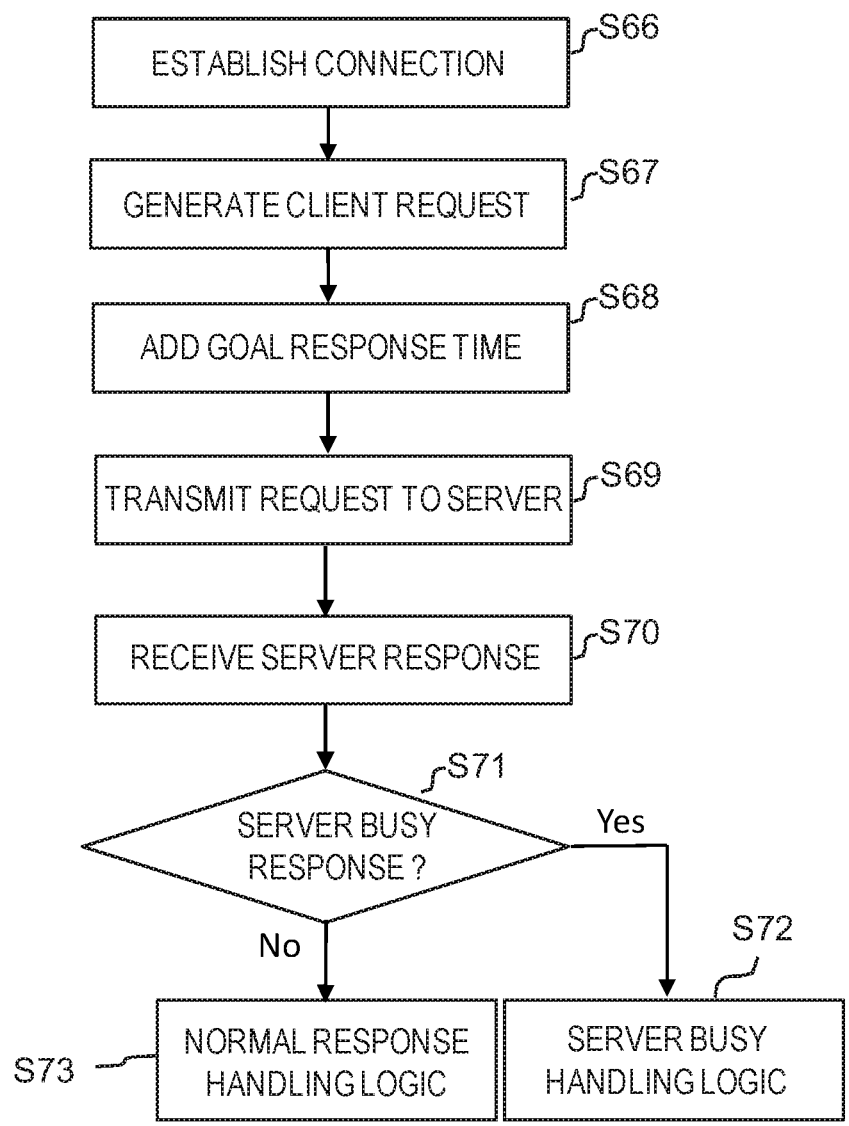
FIG. 6B is a flow chart of the connection management performed by the client of FIG. 5B.

FIG. 6B is a flow chart of the connection management performed by the client of FIG. 5B.

In Step S66, the client in collaboration with a server establishes a client-server connection to that server.

In Step S67, the client generates a conventional request.

In Step S68, the client adds to the request a goal response time specifying to the server how quickly a response is desired. (Steps S67 and S68 could be merged into a single action.)

In Step S69, the request is transmitted to the server on the client-server connection.

In Step S70, the client receives the server's response on the client-server connection.

If Step S71, if the server's response is a SERVERBUSY message, i.e. a message rejecting the client request, then flow is directed to handling logic configured to deal with a SERVERBUSY response in Step S72. For any other type of server response, then flow is directed to other handling logic configured to deal with a normal response, i.e. a substantive response to the request, in Step S73.

To implement the proposed method, it is noted that no other network resources, such as a workload manager carrying out load balancing, is involved. Nevertheless, it is noted that the proposed method can operate in parallel with such load balancing.

It will be understood that embodiments of the present disclosure may be implemented using cloud computing. Specifically, one or more of the servers and network resources may be hosted in the cloud.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
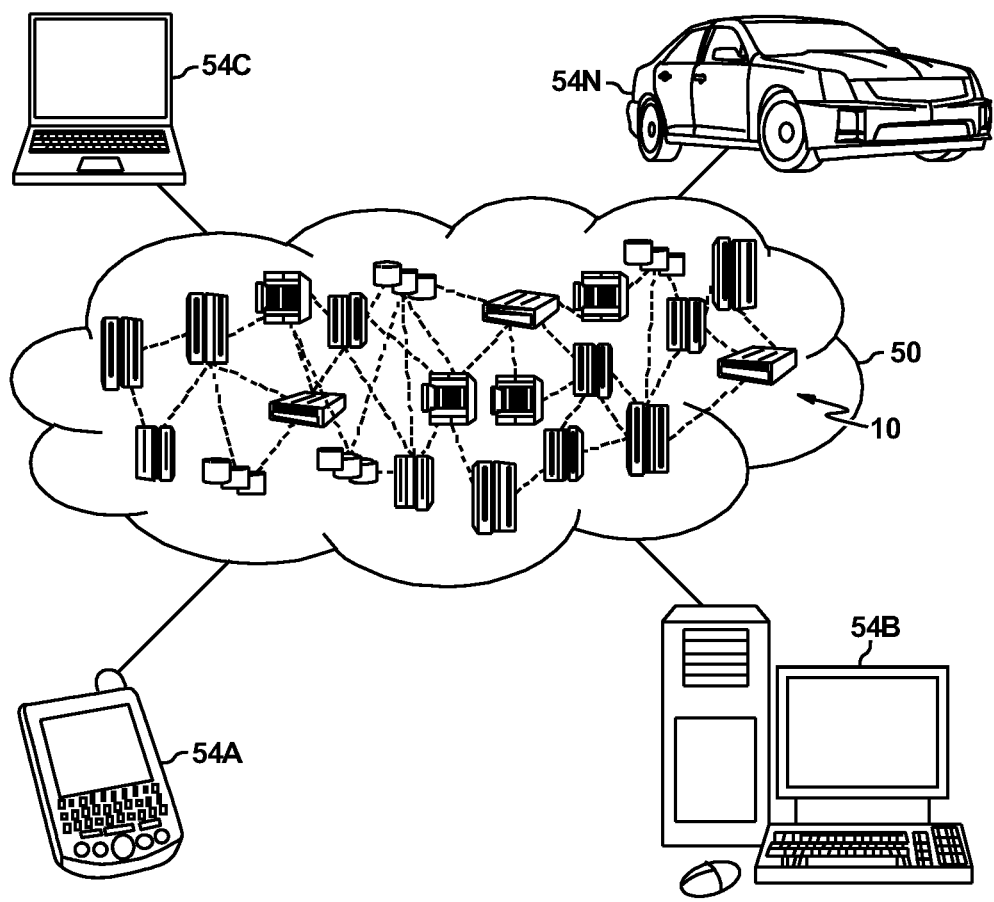
FIG. 7 depicts a cloud computing environment according to an embodiment of the present disclosure.

Referring now to FIG. 7, illustrative cloud computing environment 50 is depicted. As shown, cloud computing environment 50 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes and cloud computing environment 50 can communicate with any type of computerized device over any type of network and/or network addressable connection (e.g., using a web browser).

Figure 8:
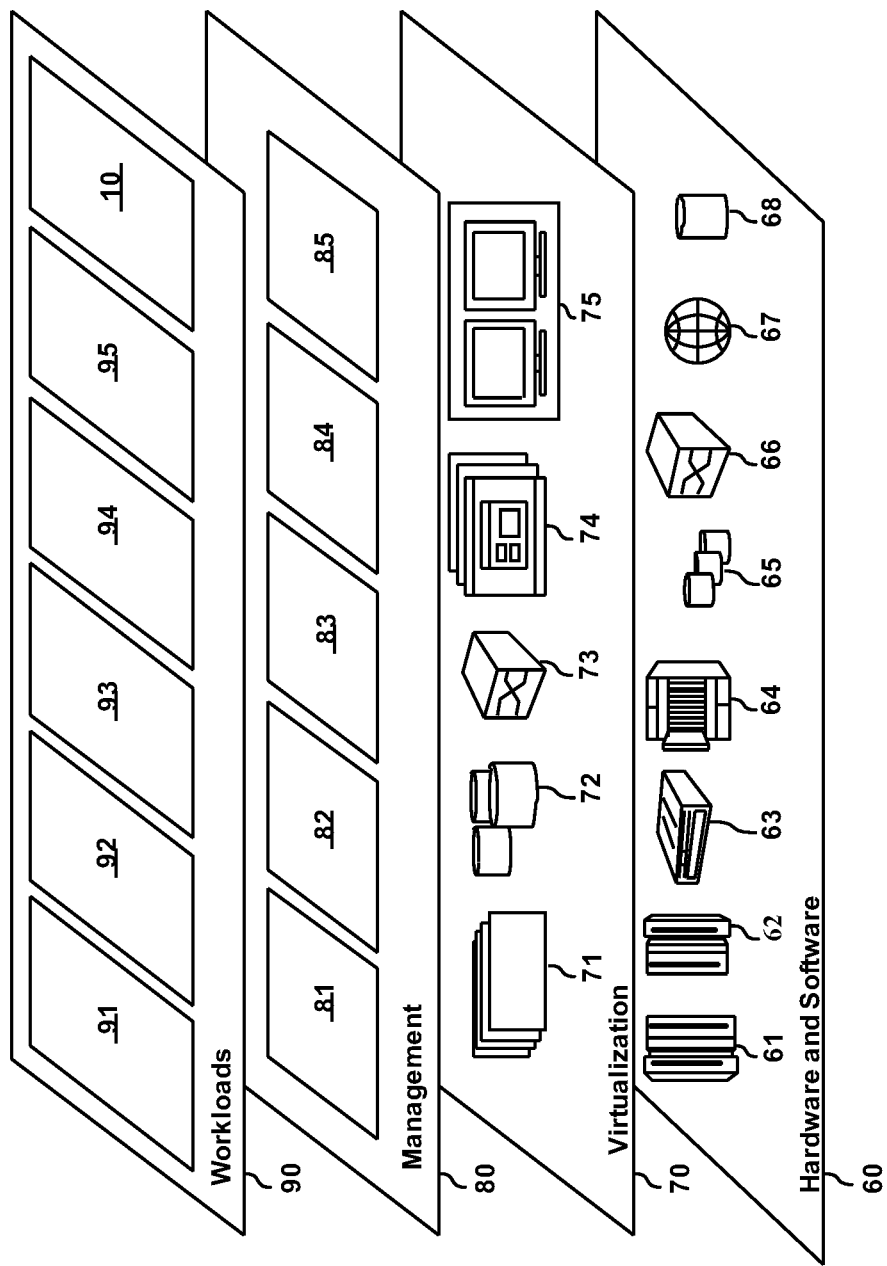
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

It will be appreciated that any of the servers or server elements shown in FIG. 1 and FIG. 2, may correspond to physical or virtualized components in layers 60 and 70 respectively.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server 10.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present disclosure may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a client, a server, a computer system comprising client and server connected over a network, a method, and/or a computer program product. The computer program product may include a computer readable storage medium (or media) having computer readable program instructions thereon for causing a processor to carry out aspects of the present invention.

It will be clear to one skilled in the art that many improvements and modifications can be made to the foregoing exemplary embodiment without departing from the scope of the present disclosure.

What is claimed is:

1. A method of managing client connections to a transaction processing server, the method being performed by the server and comprising:

receiving a client request from a client on a client-server connection;

in response to receiving the client request, extracting from the client request a client-specified goal response time indicative of a time that is requested by the client for the transaction processing server to process the client request within the goal response time; and accepting or rejecting the client request based on the transaction processing server comparing the goal response time to an expected response time based on a performance record of the client request being assessed and determining whether the goal response time is achievable based on the comparison, wherein the performance record includes historical response times for the client request.

2. The method of claim 1, further comprising:

based on the transaction processing server rejecting the client request, transmitting a rejection message to the client wherein the rejection message includes a predicted response time for processing the client request.

3. The method of claim 1, wherein the client request includes a type classification, and the indicator used for accepting or rejecting the request is specific to that type.

4. A computer program product, comprising:

a computer readable storage medium having program instructions embodied therewith, wherein the computer readable storage medium is not a transitory signal per se, the program instructions executable by a processor to cause the processor to perform a method comprising:

receiving a client request, by a transaction processing server, on a client-server connection;

extracting a goal response time from the client request, wherein the goal response time is a time that is requested by the client to the transaction processing server that indicates to the transaction processing server to process the client request within the goal response time;

accepting or rejecting the client request based on a comparison of the requested goal response time to an expected response time based on a performance record of completion times for a requested type of transactions on the transaction processing server and determining whether the goal response time is achievable based on the comparison; and based on the comparison indicating to reject the client request, the transaction processing server including in a rejection message an estimated amount of time to complete the client request.

5. The computer program product of claim 4, further comprising:

transmitting a rejection message to the client based on the client request being rejected by the transaction processing server, wherein the client request includes a type classification, and an indicator used for accepting or rejecting the request is specific to that type, and wherein the rejection message is transmitted in less time than the goal response time.

* * * * *